(12) United States Patent
Tseng

(10) Patent No.: US 8,116,827 B2
(45) Date of Patent: Feb. 14, 2012

(54) PORTABLE ELECTRONIC DEVICES

(75) Inventor: Hsu-Hsiang Tseng, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 535 days.

(21) Appl. No.: 12/196,064

(22) Filed: Aug. 21, 2008

(65) Prior Publication Data

US 2009/0054110 A1      Feb. 26, 2009

(30) Foreign Application Priority Data

Aug. 24, 2007   (TW) ................................ 96131465 A

(51) Int. Cl.
*H04M 1/00* (2006.01)
(52) U.S. Cl. .................. 455/573; 455/550.1; 455/575.1; 455/575.4; 455/343.1
(58) Field of Classification Search .............. 455/550.1, 455/572, 573, 574, 575.1, 575.3, 575.4, 343.6
See application file for complete search history.

(56) References Cited

U.S. PATENT DOCUMENTS

| | | | |
|---|---|---|---|
| 6,847,834 B1 * | 1/2005 | Leem | 455/572 |
| 7,072,696 B2 | 7/2006 | Shaff | |
| 7,206,044 B2 | 4/2007 | Li et al. | |
| 2007/0224412 A1 * | 9/2007 | Hara et al. | 428/336 |
| 2007/0238481 A1 * | 10/2007 | Gaucherot | 455/550.1 |

FOREIGN PATENT DOCUMENTS

| | | |
|---|---|---|
| CA | 2 370 733 A1 | 9/2001 |
| CN | 2924944 Y | 7/2007 |

* cited by examiner

*Primary Examiner* — Fayyaz Alam
(74) *Attorney, Agent, or Firm* — Birch, Stewart, Kolasch & Birch, LLP

(57) ABSTRACT

A portable electronic device is provided. The portable electronic device includes a housing, a circuit module, a solar module, and a keypad module. The circuit module is disposed in the housing. The solar module provides a supplied power to the circuit module. The keypad module having light transparency is disposed in the housing and covers the solar module. The solar module receives the light from a light source through the keypad module to provide the supplied power.

16 Claims, 3 Drawing Sheets

US 8,116,827 B2

PORTABLE ELECTRONIC DEVICES

CROSS REFERENCE TO RELATED APPLICATIONS

This Application claims priority of Taiwan Patent Application No. 96131465, filed on Aug. 24, 2007, the entirety of which is incorporated by reference herein.

BACKGROUND OF THE INVENTION

1. Field of the Invention

The invention relates to a portable electronic device, and more particularly to a portable electronic device with a solar cell.

2. Description of the Related Art

In general, a user needs an accessory charger to charge a low power level battery or needs to replace the low power level battery with a full power level battery when using a portable electronic device (such as a cellular phone, a personal digital assistant (PDA), a PDA phone, or other wireless communication devices etc.). However, should the user forget to bring along a charger or replaceable battery when the portable electronic device is at a low power level, the electronic device will run out of power and shut down and continuous usage by the user will no longer be available.

At present, one solution for unwanted power shut down used in some portable electronic devices, is to use solar energy technology. For example, a solar cell is integrated into a portable electronic device. However, integrating the solar cell into the portable electronic device will increase a surface area of the portable electronic device, thus increasing the overall size and reducing convenience of the portable electronic device.

Thus, integrating a solar cell into an electronic device without increasing the size of the electronic device is desired.

BRIEF SUMMARY OF THE INVENTION

Portable electronic devices are provided. An exemplary embodiment of such a portable electronic device comprises a housing, a circuit module disposed in the housing, a solar module and a keypad module having light transparency. The solar module provides a supplied power to the circuit module. The keypad module is disposed in the housing and covers the solar module. The solar module receives the light from a light source through the keypad module to provide the supplied power.

Furthermore, another exemplary embodiment of a portable electronic device comprises a housing, a plurality of electronic components disposed in the housing, a chargeable battery disposed in the housing, a solar module, and a keypad module having light transparency. The chargeable battery provides an operating voltage to the electronic components. The solar module provides a supplied power to charge the chargeable battery. The keypad module is disposed in the housing and covers the solar module. The solar module receives the light from a light source through the keypad module to provide the supplied power.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
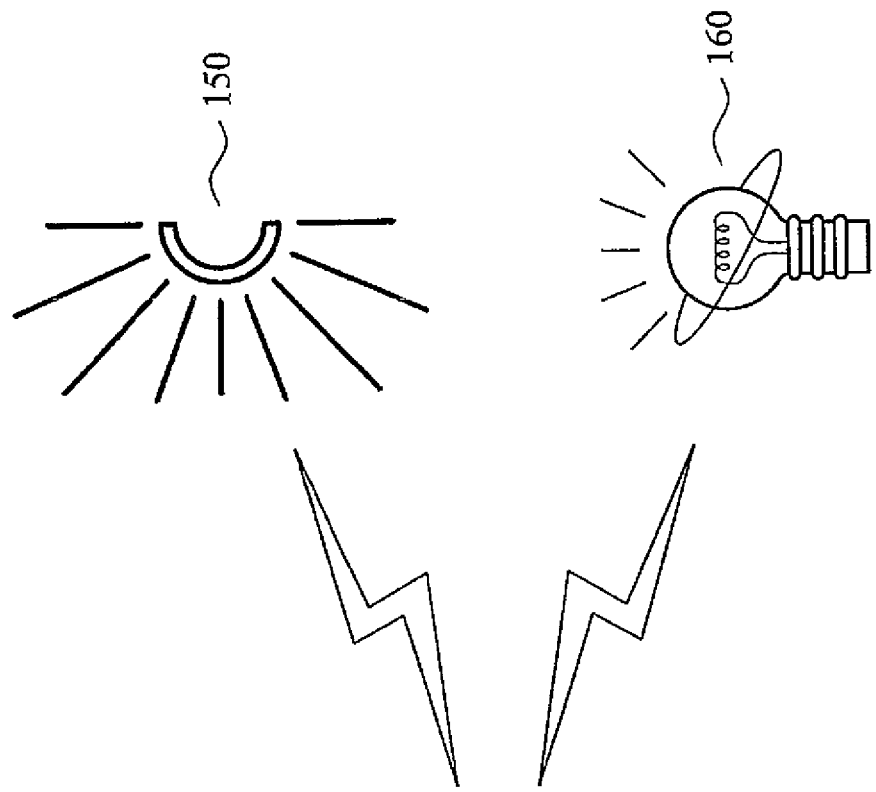
FIG. 1 shows a portable electronic device according to an embodiment of the invention.
Figure 1:
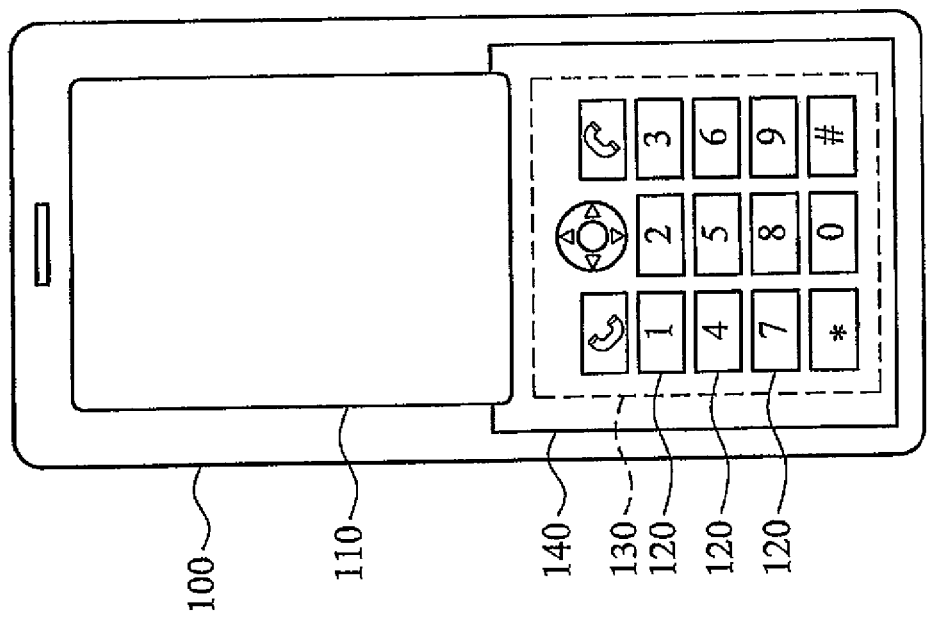

FIG. 1 shows a portable electronic device according to an embodiment of the invention. As shown in FIG. 1, the portable electronic device is a cellular phone. A housing 100 of the cellular phone comprises a display 110 and a keypad module 130, wherein the keypad module 130 comprises a plurality of keys 120. The keys 120 comprise number keys, talk key, and other function keys, wherein each of the keys 120 is formed by a material having light transparency. Except for the keys 120, the keypad module 130 further comprises a printed circuit board (PCB) (not shown). In some specific types of the keypad module 130, such as a press-type keypad module, the PCB is used to detect whether the keys 120 have been used/pressed. The PCB is also formed by the materials having light transparency, and the conductive wires or components (such as resistors or capacitors) of the PCB are formed by the transparent conductive thin films. For example, the transparent conductive thin film may be formed by indium tin oxide (ITO), which is usually used in touch-sensitive panels, liquid crystal displays (LCD) and so on. In addition, the portable electronic device also comprises a solar module 140 (or referred to as a solar panel). The solar module 140 receives the light from a natural or artificial light source (ex. the sunlight 150 or an artificial light source 160) to collect the light energy, and convert the light energy into a supplied power provided to the portable electronic device.

Figure 2:
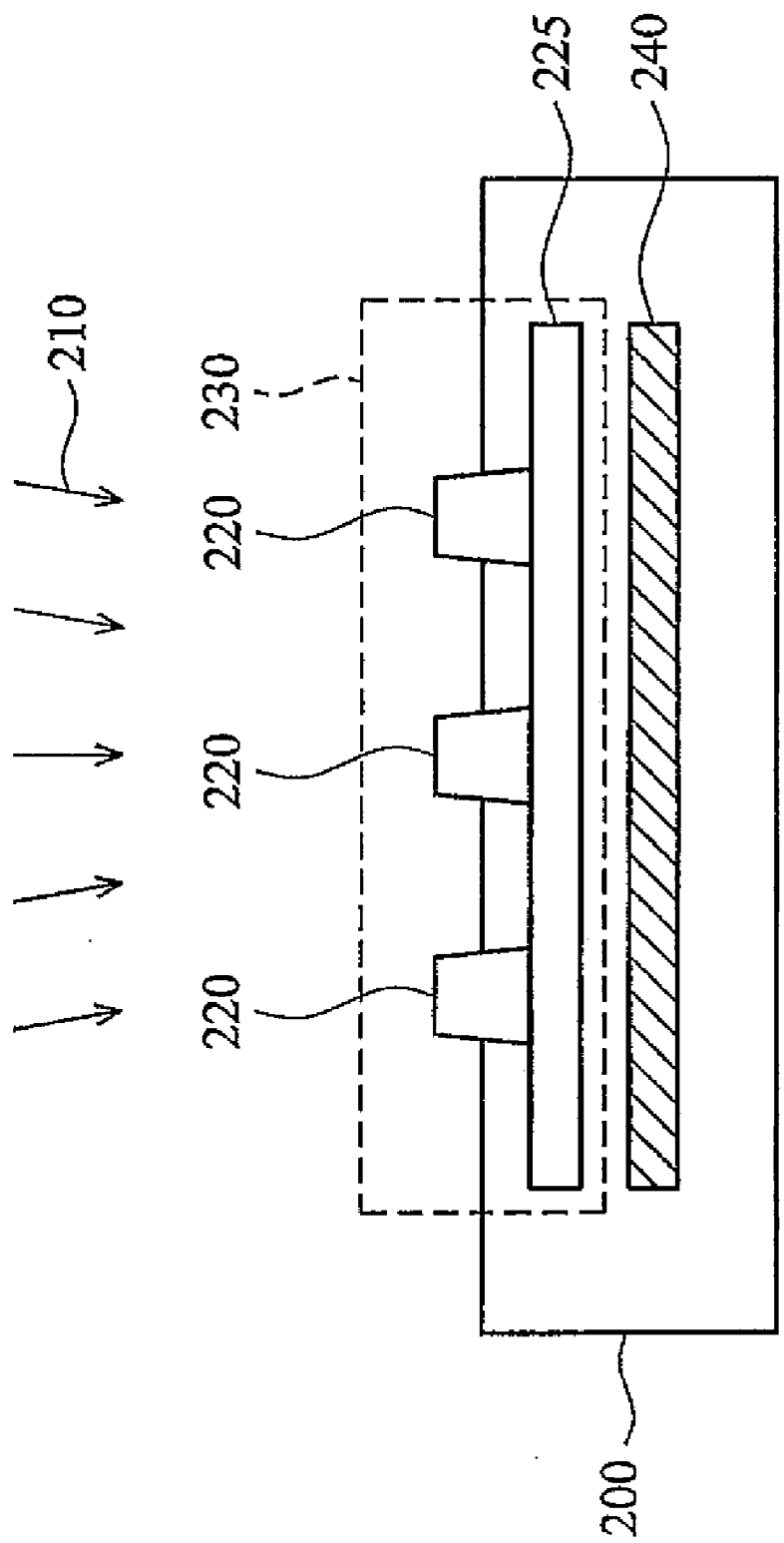
FIG. 2 shows a sectional view of a portable electronic device according to an embodiment of the invention.

FIG. 2 shows a sectional view of a portable electronic device according to an embodiment of the invention. A keypad module 230 is disposed in a housing 200. The keypad module 230 comprises a plurality of keys 220 and a PCB 225, wherein the keys 220 and the PCB 225 having light transparency. The keypad module 230 is laid over a solar module 240 such that the light 210 from a light source is transmitted to the solar module 240 through the keys 220 and the PCB 225.

Figure 3:
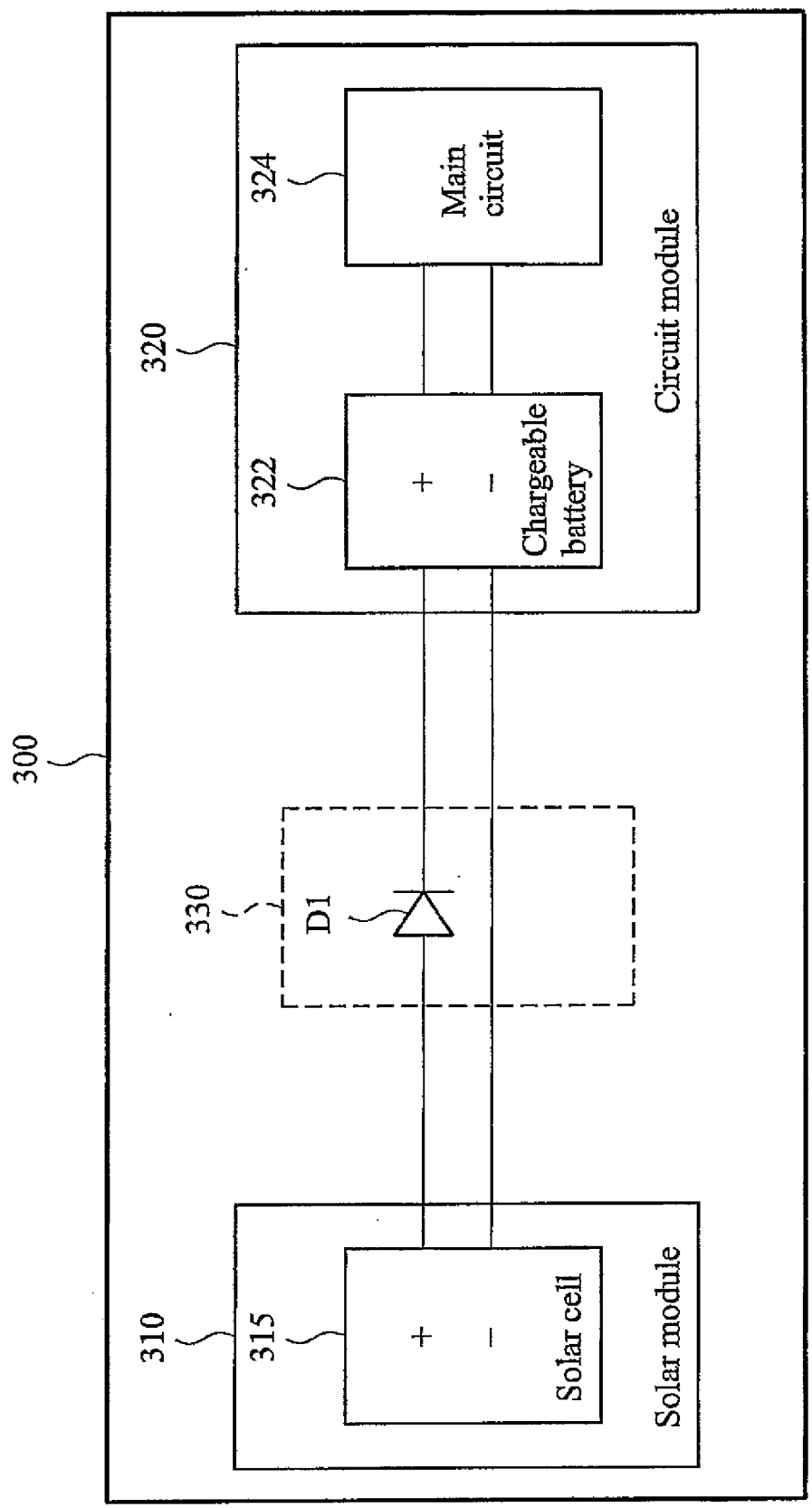
FIG. 3 shows a simple circuit diagram of a portable electronic device according to an embodiment of the invention.

Referring to FIG. 3, it shows a simple circuit diagram of a portable electronic device 300 according to an embodiment of the invention. The portable electronic device 300 comprises a solar module/panel 310 and a circuit module 320, wherein both the solar module 310 and the circuit module 320 are disposed in a housing of the portable electronic device 300. As described above, the portable electronic device 300 also comprises a keypad module (not shown), wherein the keypad module is disposed in the housing of the portable electronic device 300 and the solar module 310 is covered with the keypad module. The solar module 310 receives the light from the light source to generate the supplied power, wherein a solar cell 315 is used to store the supplied power and provide the supplied power to the circuit module 320. The circuit module 320 comprises a chargeable battery 322 and a main circuit 324. The main circuit 324 comprises a plurality of electronic components, which are used to perform different functions of the portable electronic device. In FIG. 3, the chargeable battery 322 is charged by the supplied power received by the circuit module 320. Furthermore, the chargeable battery 322 also provides an operating voltage to the circuit module 320 for operating the electronic components.

In one embodiment, the portable electronic device 300 may be a cellular phone, and the main circuit 324 may comprise a radio frequency (RF) module, a baseband chip, or other relative electronic components to perform the functions of the cellular phone. A user may use a charger (such as an adapter) to charge the chargeable battery 322. In addition to the charger, the portable electronic device 300 may also receive the light from the light source through the solar module 310 to charge the chargeable battery 322. Therefore, the chargeable battery 322 of the portable electronic device 300 is gradually charged by the solar module 310 to increase a standby time of the portable electronic device 300.

Moreover, the portable electronic device 300 further comprises a protection circuit 330 coupled between the chargeable battery 322 and the solar cell 315. In one embodiment, the protection circuit 330 comprises a diode D1. As shown in FIG. 3, the diode D1 is coupled in a forward conduction direction from an anode of the solar cell 315 to an anode of the chargeable battery 322. Therefore, if energy of the chargeable battery 322 is greater than or equal to that of the solar cell 315, such as if the chargeable battery 322 charged by the charger is at a full power level or there is no available light source for the solar module, then the diode D1 is used to avoid transmitting the energy of the chargeable battery 322 to the solar cell 315.

In the above embodiments, the keypad module of the invention may be a touch-sensitive keypad module, wherein the keys are disposed in a plane. The touch-sensitive keypad module may be a capacitive (or capacitor type) keypad module or any other touch-sensitive keypad module using a touch-sensitive trigger action.

In the above embodiments, the keypad module of the invention may be a press-type keypad module, wherein each of the keys is a physical key with a key cap.

In the above embodiments, the portable electronic device may be a cellular phone, a personal digital assistant (PDA), a PDA phone, or other wireless communication devices which conform to a portable electronic device with a keypad module.

The invention is applied to a portable electronic device with a keypad module, wherein the portable electronic device can be charged by a solar cell according to the invention. In this invention, the solar module located under the keypad module can integrate the solar cell into the portable electronic device without increasing the size of the electronic device.

In the above embodiments, although some modules are shown as separate components, the modules could also be implemented in a single component for efficiency or convenience.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A portable electronic device, comprising:
a housing;
a circuit module disposed in the housing;
a solar module for providing a supplied power to the circuit module; and
a keypad module, having light transparency, disposed in the housing and covering the solar module, and comprising a printed circuit board and a plurality of keys,
wherein the solar module receives the light from a light source through the keypad module to provide the supplied power,
wherein the printed circuit board is formed by a material having light transparency, wherein each of the plurality of keys is formed by a material having light transparency and the solar module is arranged directly underneath the plurality of keys so that the light is transmitted through the plurality of keys and the printed circuit board to the solar module.

2. The portable electronic device as claimed in claim 1, wherein the printed circuit board comprises a transparent conductive thin film.

3. The portable electronic device as claimed in claim 2, wherein the transparent conductive thin film is formed by indium tin oxide (ITO).

4. The portable electronic device as claimed in claim 1, wherein the keypad module is a touch-sensitive keypad module.

5. The portable electronic device as claimed in claim 1, wherein each of the keys is a physical key with a key cap.

6. The portable electronic device as claimed in claim 1, wherein the circuit module comprises a chargeable battery.

7. The portable electronic device as claimed in claim 6, wherein the circuit module receives the supplied power to charge the chargeable battery.

8. The portable electronic device as claimed in claim 6, wherein the solar module comprises a solar cell for storing the supplied power.

9. The portable electronic device as claimed in claim 8, further comprising a protection circuit, which is coupled between the chargeable battery and the solar cell and is used to avoid transmitting energy of the chargeable battery to the solar cell.

10. A portable electronic device, comprising:
a housing;
a plurality of electronic components disposed in the housing;
a chargeable battery disposed in the housing, providing an operating voltage to the electronic components;
a solar module for providing a supplied power to charge the chargeable battery; and
a keypad module, having light transparency, disposed in the housing and covering the solar module, and comprising a printed circuit board and a plurality of keys,
wherein the solar module receives the light from a light source through the keypad module to provide the supplied power,
wherein the printed circuit board is formed by a material having light transparency,
wherein each of the plurality of keys is formed by a material having light transparency and the solar module is arranged directly underneath the plurality of keys so that the light is transmitted through the plurality of keys and the printed circuit board to the solar module.

11. The portable electronic device as claimed in claim 10, wherein the printed circuit board comprises a transparent conductive thin film.

12. The portable electronic device as claimed in claim 11, wherein the transparent conductive thin film is formed by indium tin oxide (ITO).

13. The portable electronic device as claimed in claim 10, wherein the keypad module is a touch-sensitive keypad module.

14. The portable electronic device as claimed in claim 10, wherein each of the keys is a physical key with a key cap.

15. The portable electronic device as claimed in claim 10, wherein the solar module comprises a solar cell for storing the supplied power.

16. The portable electronic device as claimed in claim 15, further comprising a protection circuit, which is coupled between the chargeable battery and the solar cell and is used to avoid transmitting energy of the chargeable battery to the solar cell.

\* \* \* \* \*